United States Patent

[11] 3,579,223

| | | | |
|---|---|---|---|
| [72] | Inventor | Arthur B. McKaig<br>Bellevue, Wash. (P.O. Box 228, Belfair, Wash. 98528) | |
| [21] | Appl. No. | 739,835 | |
| [22] | Filed | June 25, 1968 | |
| [45] | Patented | May 18, 1971 | |

[54] TRANSISTORIZED MONITORING CIRCUIT
4 Claims, 3 Drawing Figs.

[52] U.S. Cl. .................................................. 340/248, 340/251
[51] Int. Cl. ..................................................... G08b 21/00
[50] Field of Search ........................................ 340/248, 251; 315/131

[56] References Cited
UNITED STATES PATENTS

| | | | | |
|---|---|---|---|---|
| 2,959,717 | 11/1960 | Conger | | 340/248UX |
| 3,254,235 | 5/1966 | Schird et al. | | 340/248X |
| 3,293,630 | 12/1966 | McKaig | | 340/248 |
| 3,366,834 | 1/1968 | Potter | | 315/131 |
| 3,405,357 | 10/1968 | Thompson | | 340/248X |

Primary Examiner—John W. Caldwell
Assistant Examiner—Daniel Myer
Attorney—Roy E. Mattern, Jr.

ABSTRACT: The invention consists of modifications and improvements to the monitoring circuit of U.S. Pat. No. 3,293,630. These changes increase the sensitivity and accuracy of the monitoring circuit by an improved interconnection with the monitored circuit, provide an adjustment to compensate for manufacturing tolerances in components, provide an adjustment for matching the monitoring circuit to the monitored circuit, eliminate problems with alternating current waveshape in the monitored circuit, eliminate false indications by effective use of time delay circuits and furnish more usable monitoring information by including a gating circuit.

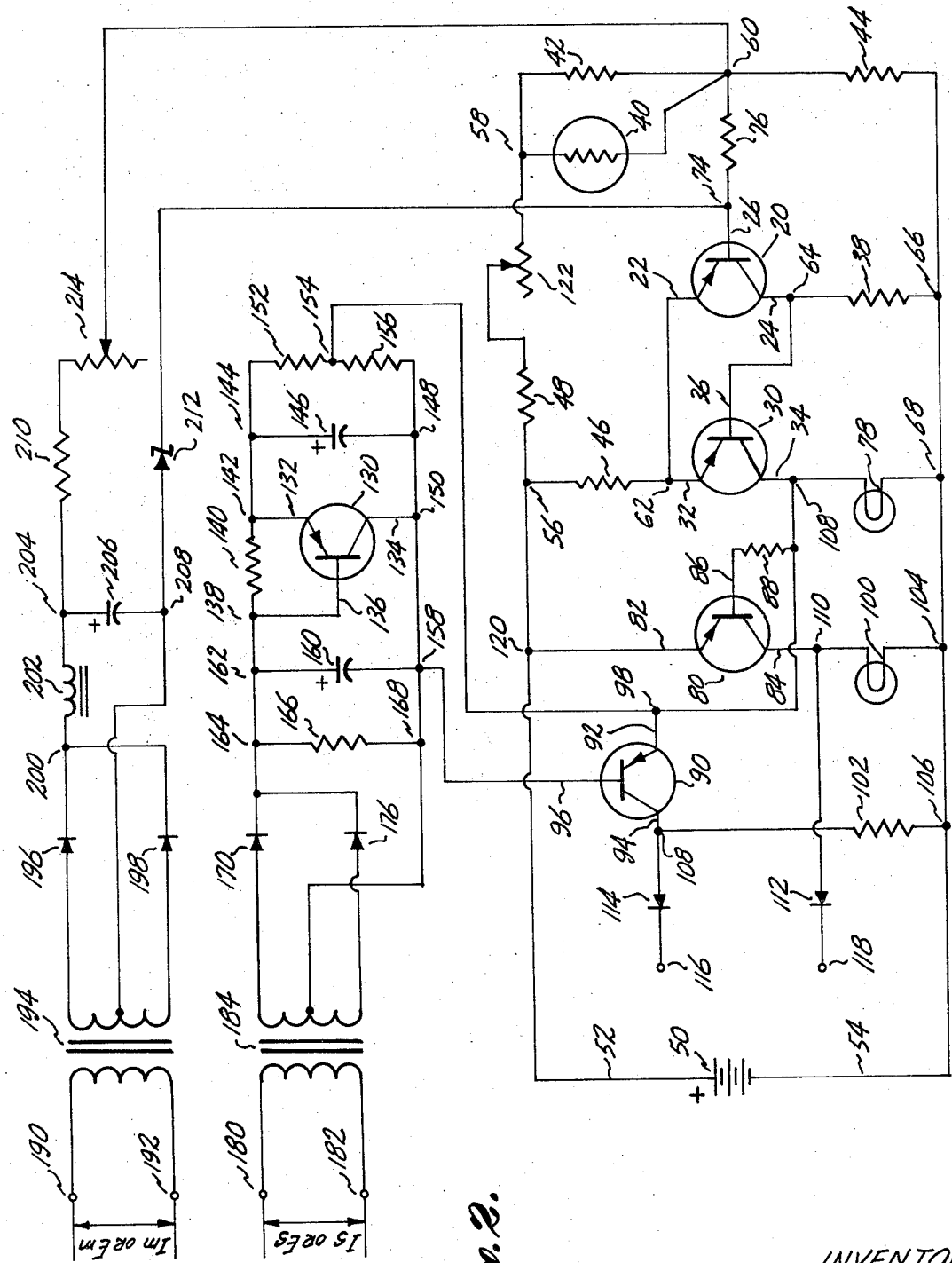

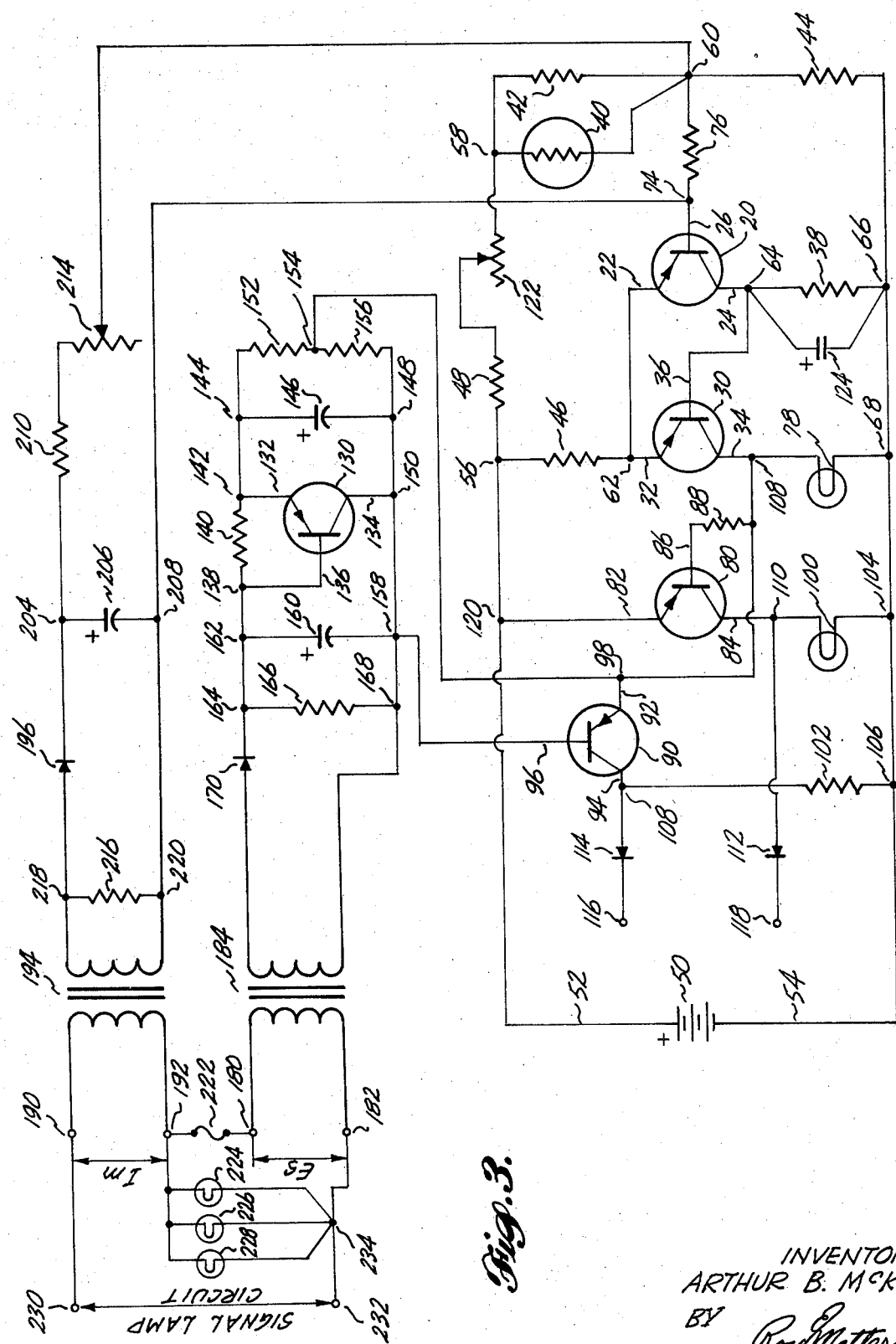

TRANSISTORIZED MONITORING CIRCUIT

BACKGROUND OF THE INVENTION

The basic monitoring circuit of U.S. Pat. No. 3,293,630 is unique in its stability. Practical application of the circuit revealed some deficiencies and areas for improvement, such as a need for increased sensitivity, a need for adjustments, a need for eliminating errors caused by alternating current waveshape in a monitored circuit, and a need for eliminating false monitoring information. These practical needs are covered by this invention.

SUMMARY OF INVENTION

This invention provides a highly stable and accurate monitoring circuit for such diverse applications as a solid-state voltmeter, a direct current monitor for lighting circuits in an automobile, an alternating current monitor for traffic signal lamps, a current monitor for navigation and bridge clearance lights, an alternating current voltage relay, a battery voltage monitor, a voltage sensing control for an automatic tap changing power transformer, and a current monitor for lamp filaments in a Coast Guard lighthouse. All of these applications represent practical embodiments of the invention which have already been built and made operational.

The current monitor for traffic signal lamps is an application utilizing both normal and alarm outputs on the same monitoring circuit. This permits other electronic equipment to transmit normal lamp operations and lamp failure information to a remote location. Use of this monitoring circuit thus permits complete remote surveillance of traffic lamps at an intersection.

DRAWINGS

The improved monitoring circuit, as covered by this invention, is utilized in conjunction with many different circuits as suggested by the illustrations, wherein like numerals refer to like components in the drawings where:

FIG. 2 is a schematic diagram showing the monitoring circuit with additional circuit components for monitoring either alternating current or voltage; and FIG. 3 is a schematic diagram showing the monitoring circuit and additional circuit components for monitoring alternating current in a traffic signal lamp circuit.

DIRECT CURRENT OR VOLTAGE MONITORING

Figure 1:
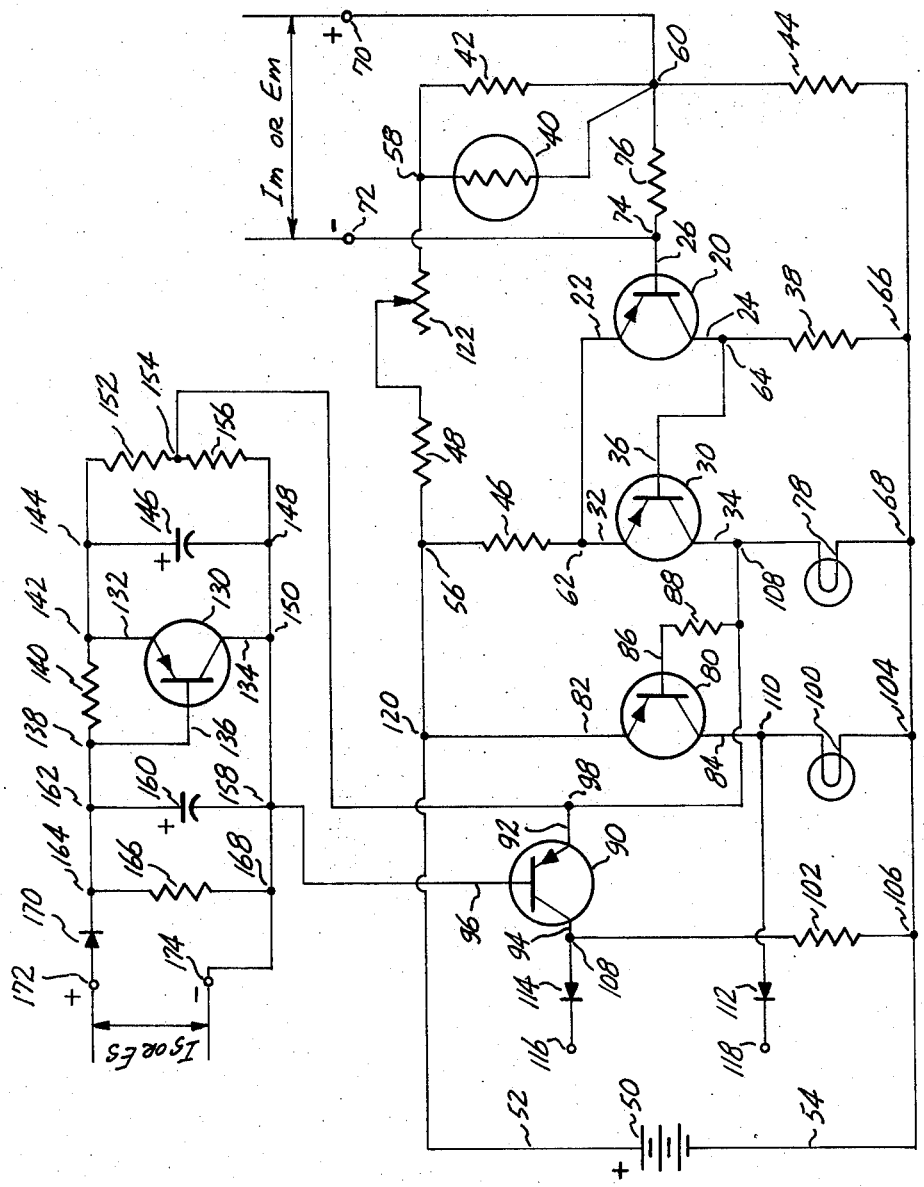
FIG. 1 is a schematic diagram showing the monitoring circuit with additional circuit components for monitoring either direct current or voltage.

In FIG. 1, a direct current $I_m$ or voltage $E_m$ to be monitored, are applied at positive terminal 70 and negative terminal 72, assuming that sufficient external resistance is supplied to limit current flow between terminals 70 and 72.

An isolated reference voltage source represented by battery 50 is connected to the positive side of the monitoring circuit by wire 52 and to the negative side by wire 54. Current flows from battery 50 through resistor 48, adjustable resistor 122, through thermistor 40 and resistor 42, through resistor 44 and through wire 54 back to battery 50. This current causes a voltage drop between points 56 and 60, establishing a normal bias voltage between emitter 22 and base 26 of detector transistor 20. Current flowing between principal circuit terminal 70 and 72 causes a voltage drop across resistor 76, adding to the bias voltage already present between emitter 22 and base 26 of transistor 20. With normal current or voltage present in the principal circuit, adjustable resistor 122 is set to provide normal bias in transistor 20 resulting in current flow from battery 50 through wire 52 to point 56 through resistor 46 to point 62 through the emitter 22 and collector 24 of detector transistor 20 to point 64 through resistor 38 to point 66 and back through wire 54 to battery 50. The flow of current through resistor 38 raises the potential of point 64 sufficiently close to the potential of point 62 that the bias voltage between the emitter 32 and base 36 of power transistor 30 will not permit current to flow from emitter 32 to the collector 34 of power transistor 30 and through indicator lamp 78 (indicator lamp 78 could be relay or load resistor) and back to battery 50. Thus a normal voltage or current above a predetermined or set point appearing between principal circuit terminal 70 and 72 will not cause or permit transistor 30 to conduct.

However, should the principal circuit or voltage being monitored fall off, reducing the drop in potential across resistor 76, the bias voltage between points 62 and 74 associated with detector transistor 20 is reduced, which in turn reduces the current flowing from point 56 through resistor 46 to point 62 through the emitter 22 and collector 24 of detector transistor 20 on to point 64 and through resistor 38. Such change in current flow lowers the potential of point 64 with respect to point 62, thus increasing the bias voltage between emitter 32 and base 36 of power transistor 30. Upon increase in its bias voltage, transistor 30 conducts current flow from point 62 to its emitter 32, and out its collector 34 through indicator lamp 78 on to point 68 and back to battery 50. Thus a reduction in normal voltage or current across resistor 76 below a predetermined point will cause transistor 30 to conduct until the principal circuit voltage or current being monitored returns to normal. The use of resistor 76 makes transistor 20 extremely sensitive to minute changes in the monitored signal, such changes being in the order of 1 millivolt.

The function of resistor 46 in providing a snap action, or specific operating point for the monitoring circuit will not be discussed here as it is covered in detail in column 4, lines 23 through 75 and column 5, lines 1 through 12 of U.S. Pat. No. 3,293,630.

Operation of the monitoring circuit in response to a reduction in principal circuit direct current or voltage has been described, to the effect that power transistor 30 is now conducting and point 108 is positive in respect to point 68 or battery terminal 54. Likewise, points 98, 108 and 116 will be positive providing that gate transistor 90 is conducting.

Gate transistor 90 is controlled by a principal circuit signal current $I_s$ or signal voltage $E_s$ applied with positive to terminal 172 and negative to terminal 174; thereby the principal circuit controls whether or not a positive voltage appears at point 116 (alarm condition) in response to a reduction in current or voltage in the monitored principal circuit. Application of positive signal at point 172 and negative at 174 causes current to flow through isolating diode 170 to point 164 to point 162 to point 138 through resistor 140 to point 142 to point 144 where the current divides, part of it charging capacitor 146 and part of it flowing through resistors 152 and 156 to point 148 and back to negative terminal 174. Capacitor 160 filters any ripple. Point 154 cannot rise in potential above point 158 to the normal bias voltage for gate transistor 90 until capacitor 146 is charged, thereby introducing a time delay in the operation of gate transistor 90 since emitter 92 is connected to point 154 and base 96 is connected to point 158. This time delay permits principal circuit to stabilize before an alarm may be transmitted.

When the signal current $I_s$ or voltage $E_s$ is removed from terminals 172 and 174, isolating or blocking diode 170 prevents any interconnection with the principal circuit, while capacitor 146 begins to discharge with current flowing from point 144 through resistors 152 and 156 back to point 148, while at the same time current flows from point 144 through resistor 140 to point 164 through resistor 166 to point 168 and back to point 148; current flow through resistor 140 causes a voltage drop from point 142 to point 138, causing a normal biasing voltage between emitter 132 and base 136 of discharge transistor 130, thereby causing transistor 130 to conduct between emitter 132 and collector 134, shorting points 144 and 148 which immediately discharges capacitor 146. The shorting action of transistor 130 is essentially instantaneous, which causes gate transistor 90 to likewise open instantaneously after removal of signal current $I_s$ or voltage $E_s$ from terminals 172 and 174.

Power transistor 80 is included in FIG. 1 and provides a positive voltage output at point 118 when the principal circuit being monitored is above the predetermined or set point. Operation of power transistor 30 in providing a positive voltage at point 108 and point 116 when the principal circuit is below the set point has previously been described. Transistor 80 conducts when transistor 30 is nonconducting; likewise transistor 80 is nonconducting when transistor 30 conducts. Bias of power transistor 80 between emitter 82 and base 86 is controlled by the potential of point 108; when transistor 30 conducts and point 108 is positive, the bias voltage between emitter 82 and base 86 of transistor 80 is too small to permit transistor 80 to conduct. When transistor 30 is not conducting, point 108 is at negative potential same as point 68, permitting current to flow through base resistor 88 which increases bias between emitter 82 and base 86 to the conducting point and letting current flow through emitter 82 to collector 84 through indicator lamp 100 back to battery 50. This makes point 110 positive which in turn makes point 118 positive through isolating diode 112. Thus it is seen that power transistor 80 is out of phase with power transistor 30 and the combination of the two transistors will provide an output monitoring signal at points 116 or 118 whenever the principal circuit is below or above the predetermined set point.

A choice of several outputs in available. Indicator lamps 78 and 100 may be replaced with load resistors, alarm buzzers or relay coils. Load resistors will provide voltage outputs at points 116 and 118. Isolating diodes 114 and 112 prevent reverse current flow into the monitor circuit, in the event several monitors are connected to the same alarm circuit. Resistor 102 serves to discharge any leakage current flowing through gate transistor 90 from emitter 92 to collector 94 when the transistor is not conducting.

ALTERNATING CURRENT OR VOLTAGE MONITORING

In FIG. 2, the monitoring circuit is arranged to be connected at point 190 and 192 to monitor either alternating current $I_m$ or voltage $E_m$ of a principal circuit. The current $I_m$ or voltage $E_m$ energizes current transformer or potential transformer 194. The secondary winding of transformer 194 is connected through rectifier diodes 196 and 198 and the rectified voltage appearing with positive at point 200 and negative at point 208 is proportional to the voltage or current to be monitored. Filter choke 202 and filter capacitor 206 reduce the ripple in the rectifier output. By careful selection of the proper value, filter choke 202 serves the additional purpose of eliminating the effect of alternating current waveshape on the DC voltage appearing between points 204 and 208. Current then flows, in proportion to the monitored current or voltage, from point 204 through resistor 210 through adjustable resistor 214 to point 60 through resistor 76 to point 74 through Zener diode 212 to point 208 and then back through the rectifier circuit. Zener diode 212 functions to maintain a constant voltage drop in the sensing circuit just described, and functions to make the monitoring circuit responsive only to rectified voltages above the rating of the Zener diode 212. By using Zener diode 212, the sensitivity of the monitoring circuit is further increased.

With the exception of a minor change in the gate or control circuit to be described later, the balance of the basic monitoring circuit functions exactly as described in FIG. 1 for direct current monitoring. It should be noted that by installing a calibrated dial on adjustable resistor 214, and by using indicator lamps 78 and 100 to position the dial, the monitoring circuit can function as a highly accurate AC voltmeter or ammeter. Accuracies of 1/10 percent are readily obtainable.

Gate transistor 90 is controlled by alternating current $I_s$ or voltage $E_s$ signal connected at point 180 and 182. A voltage is developed in secondary winding of potential or current transformer 184 and is rectified by full wave rectifier diodes 170 and 176 causing a positive voltage to appear at point 164 and negative voltage at point 168, with the ripple being reduced by filter capacitor 160.

Operation of the balance of the gate circuit is exactly as described in FIG. 1 for direct current monitoring.

MONITORING TRAFFIC SIGNAL LAMPS

In FIG. 3 the monitoring circuit is applied specifically for monitoring alternating current in a traffic signal lamp circuit. Except for minor modifications in the principal circuit arrangement, and some optional simplification of the alternating current rectifier circuits, the circuit is essentially identical to FIG. 2.

When the signal lamp circuit is energized by applying 120 volts alternating current to principal circuit terminals 230 and 232, current flows to point 190 through primary winding of current transformer 194 to point 192 through signal lamps 224, 226 and 228 to point 234 and then to terminal 232. Except for the fraction of a volt loss in the primary of current transformer 194, the full voltage appearing on principal circuit terminals 230 and 232 is also present between points 192 and 182, causing a current to flow through fuse 222 to point 180 and through primary winding of potential transformer 184 to point 182 and back to terminal 232, reversing in the manner of alternating current.

The voltage developed in the secondary winding of current transformer 194 and between points 218 and 220 across load resistor 216 is rectified by half-wave rectifier diode 196, appearing as a DC voltage between points 204 and 208 where the ripple is removed by filter capacitor 206. This DC voltage between points 204 and 208 is proportional to the alternating current flowing between principal circuit terminals 230 and 232. Current flows from point 204 through fixed resistor 210 and adjustable resistor 214 to point 60 through resistor 76 to point 74 and back to point 208, with the total resistance of resistor 210 and adjustable resistor 214 determining the proper current flow through resistor 76. Adjustable resistor 214 permits adapting the same monitor circuit components to different current values in the signal lamp circuit.

The bias voltage supply for gate transistor 90 is obtained through potential transformer 184. When the signal lamp circuit is energized, whether or not current flows through signal lamps 224, 226 and 228, transformer 184 is energized, developing a rectified voltage between points 164 and 168 across resistor 166 through half-wave rectifier 170, with the ripple being smoothed by filter capacitor 160. As described for FIGS. 1 and 2, gate transistor 90 will conduct only when voltage is present between points 180 and 182 when the principal circuit is energized.

When voltage is applied to principal circuit terminals 230 and 232, and normal current is passing through the signal lamps 224, 226 and 228 the voltage drop across resistor 76 maintains the current flow through detector transistor 20 sufficiently that power transistor 30 does not conduct thereby lowering the potential of point 108 to the negative potential of point 68, thus lowering the potential of alarm output terminal 116 through gate transistor 90 to negative potential; this is the normal condition with no alarm present. At the same time power transistor 80 is conducting holding point 110 at positive potential thereby raising normal output terminal 118 to positive potential; the positive potential of terminal 118 can be used to indicate normal operation of the traffic signal lamps.

If signal lamp 224 burns out, the resultant voltage drop in resistor 76 is reduced through the set point, causing power transistor 30 to conduct and power transistor 80 to cease conducting. Positive voltage is then available through gate transistor 90 to alarm output terminal 116 indicating system failure, and since the power transistor 80 no longer conducts, normal output voltage is no longer available at normal output terminal 118. The requirement for gate transistor 90 with associated circuitry is evident by the fact that when the signal lamp circuit is off and no voltage is present between terminals 230 and 232, the monitoring circuit recognizes this as an alarm condition with less than normal current, causing power transistor 30 to conduct which would result in an alarm voltage on output terminal 116 if gate transistor 90 did not cease to conduct immediately upon loss of voltage at terminals 180 and 182. Therefore, when the principal signal lamp circuit is deenergized, no output voltage is available from alarm output terminal 116. Power transistor 80 is not conducting and no signal is present at normal output terminal 118.

When signal lamp circuit voltage is reestablished between terminals 230 and 232, time delay capacitor 146 prevents gate transistor 90 from conducting immediately, until current is stabilized in the signal lamp circuit. When signal lamp circuit is turned off, discharge transistor 130 immediately removes the biasing voltage for gate transistor 90 as previously described for FIG. 1. Time delay capacitor 124 further delays the conducting state of power transistor 30 to insure that gate transistor 90 is fully nonconducting before power transistor 30 conducts and raises the potential of point 108 to positive, thus avoiding a false alarm at alarm output terminal 116.

The monitoring circuits have been illustrated with PNP transistors, although it should be noted that NPN transistors may be used with equal performance, providing necessary polarity connections are reversed.

The monitoring circuits illustrate the gate transistor 90 connected to the collector circuit of power transistor 30, which provides an alarm signal when the monitored principal circuit value is below the predetermined or set point. For those applications requiring an alarm when the monitored circuit is above the set point, gate transistor 90 may instead by connected to power transistor 80. In certain applications, two gate transistors may be used, one for each output.

I claim:

1. A circuit for use with a basic electrical monitoring circuit for producing an indication whenever the magnitude of a monitored electrical signal deviates beyond at least one predetermined limit, said circuit comprising a source of direct current potential, first and second transistors having their emitters connected in common to the positive side of said source through a first resistor and having the base of said first transistor and the collector of said second transistor connected in common to the negative side of said source through a second resistor, an indicator connected between the collector of said first transistor and the negative side of said source, means including said source for normally biasing said second transistor to a predetermined conductive level such that its emitter to collector potential maintains said first transistor nonconductive, a third resistor connected across a direct current signal proportional in magnitude to the magnitude of said monitored electrical signal, said third resistor also connected between the base of said second transistor and said normal biasing means, said direct current signal thus supplementing the potential applied to said second transistor emitter base circuit by said biasing means, whereby, when said direct current signal diminishes to a predetermined magnitude, the emitter-collector potential of said second transistor causes conduction by said first transistor.

2. The circuit as defined in claim 1 and including a third transistor having its emitter connected to the positive side of said potential source, with the base of said third transistor connected to the collector of said first transistor by means of a fourth resistor, and with the collector of said third transistor connected through an indicator to the negative side of said potential source, whereby, said third transistor thus conducts out of phase with said first transistor.

3. The circuit as defined in claim 1 and including a fourth transistor controlling the output indication signal from the collector of said first transistor, said fourth transistor having its emitter connected to the collector of said first transistor and the collector of said fourth transistor serving as output terminal, with the emitter and base of said fourth transistor being connected to an external biasing voltage, a fifth resistor connected between said collector of said fourth transistor and the negative side of said potential source, the application of said biasing voltage causing said fourth transistor to conduct and thus provide said output indication signal, or contrariwise, the absence of said biasing voltage preventing said fourth transistor from conducting and thus blocking said output indication signal.

4. The circuit as defined in claim 3 and including means for biasing said fourth transistor, said means for biasing comprising at least a sixth, seventh and eighth resistors connected in series across a control signal potential source with the junction of said sixth and seventh resistors connected to the emitter of said fourth transistor and the negative of said control signal potential connected to the base of said fourth transistor, a time-delay capacitor connected to the junction of said seventh and eighth resistors and to the negative of said control signal potential, a ninth resistor connected across said control signal potential, and a fifth transistor with emitter connected to the junction of said seventh and eighth resistors and with base connected to positive and collector connected to negative of said control signal potential, whereby conduction of said fourth transistor is delayed by charging time for said time-delay capacitor after said control signal potential is applied, and conduction of said fourth transistor ceases immediately after removal of said control signal potential due to immediate discharge of said time-delay capacitor by conduction of said fifth transistor.